US012032462B2

(12) United States Patent
Mink et al.

(10) Patent No.: US 12,032,462 B2
(45) Date of Patent: Jul. 9, 2024

(54) PRESERVING HARDWARE STATUS POINTS IN OPERATING SYSTEM ENVIRONMENT FOR USE IN PREBOOT DIAGNOSTICS

(71) Applicant: Dell Products L.P., Round Rock, TX (US)

(72) Inventors: Jacob Mink, Austin, TX (US); Balasingh P. Samuel, Round Rock, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 17/970,301

(22) Filed: Oct. 20, 2022

(65) Prior Publication Data

US 2024/0134765 A1  Apr. 25, 2024

(51) Int. Cl.
  *G06F 11/00* (2006.01)
  *G06F 9/4401* (2018.01)
  *G06F 11/30* (2006.01)

(52) U.S. Cl.
  CPC ........ *G06F 11/3058* (2013.01); *G06F 9/4401* (2013.01)

(58) Field of Classification Search
  CPC .................................................. G06F 11/3058
  See application file for complete search history.

(56) References Cited

U.S. PATENT DOCUMENTS

| | | | | | |
|---|---|---|---|---|---|
| 5,699,502 | A | * | 12/1997 | Swanberg | G06F 11/2289 714/24 |
| 6,249,885 | B1 | * | 6/2001 | Johnson | H04L 41/22 709/224 |
| 6,745,343 | B1 | * | 6/2004 | Barenys | G06F 11/327 714/36 |
| 10,176,330 | B2 | * | 1/2019 | Thom | G06F 21/577 |
| 10,338,994 | B1 | * | 7/2019 | Xie | G06F 11/0793 |
| 10,645,106 | B2 | * | 5/2020 | Shi | H04W 12/06 |
| 2019/0018729 | A1 | * | 1/2019 | Shepard | G06F 11/3409 |
| 2019/0129821 | A1 | * | 5/2019 | Lee | G06F 11/3452 |
| 2023/0281666 | A1 | * | 9/2023 | Field | G06Q 30/0261 705/14.58 |

\* cited by examiner

*Primary Examiner* — Amine Riad
(74) *Attorney, Agent, or Firm* — Jackson Walker L.L.P.

(57) ABSTRACT

Disclosed methods and system feature or perform operations including monitoring, within an operating system (OS) environment of an information handling system, telemetry data indicative of values for one or more hardware status parameters and generating any of one or more anomaly alerts responsive to identifying any of one or more anomalous conditions. Responsive to detecting an anomaly alert, an OS-context configuration may be determined based on the hardware status parameters monitored during a timebox associated with the anomaly alert. Responsive to detecting a reset of the information handling system, preboot operations may be performed wherein the pre-boot operations may include configuring the information handling system in accordance with the OS-context configuration and performing one or more hardware diagnostic routines while the information handling system is configured in accordance with the OS-context configuration.

18 Claims, 6 Drawing Sheets

PRESERVING HARDWARE STATUS POINTS IN OPERATING SYSTEM ENVIRONMENT FOR USE IN PREBOOT DIAGNOSTICS

TECHNICAL FIELD

The present disclosure relates to information handling systems and, more specifically, management and maintenance of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Manufacturers and distributors of information handling systems must be able to address and resolve issues that arise after a system has been delivered to a customer. Achieving first time resolution of reported issues and reducing unnecessary and repeated hardware dispatches are critical objectives of our an OEM's serviceability strategy. OEMs may have product development teams working in conjunction with customer satisfaction and field services teams to meet these objectives.

Traditionally, preboot-based diagnostics have proven to be the most effective method for detecting hardware problems. Preboot diagnostic code executes within an isolated environment free from operating system (OS) driver dependency and software/services issues. Typically, however, reported problems occur during a productivity phase or host OS environment and the same issue may not appear when pre-boot diagnostics are subsequently performed following a reboot of the system, during which the hardware status, environmental factors, and hardware interaction from the OS context are lost.

SUMMARY

In accordance with teachings disclosed herein, common problems associated with conventional pre-boot diagnostics are addressed by methods and system disclosed herein, which may feature or perform operations including monitoring, within an operating system (OS) environment of an information handling system, telemetry data indicative of values for one or more hardware status parameters and generating any of one or more anomaly alerts responsive to identifying any of one or more anomalous conditions. Responsive to detecting an anomaly alert, an OS-context configuration may be determined based on the hardware status parameters monitored during a timebox associated with the anomaly alert. Responsive to detecting a reset of the information handling system, preboot operations may be performed wherein the pre-boot operations may include configuring the information handling system in accordance with the OS-context configuration and performing one or more hardware diagnostic routines while the information handling system is configured in accordance with the OS-context configuration.

The telemetry data is indicative of a usage, performance, or characteristic of a hardware component and the hardware status parameters may include central processing unit (CPU) usage, CPU power, memory usage, memory map information, graphics processing unit (GPU) load, input/output (I/O) resource throughput, temperature information indicative of a skin or junction temperature of a hardware component, fan information, dynamic tuning information, and so forth.

The anomalous conditions include one or more anomalous conditions selected from a blue screen error condition, a fan speed condition corresponding to a fan speed exceeding a fan speed threshold for a specified duration, a battery discharge rate condition corresponding to a battery discharge rate exceeding a battery discharge rate threshold, a thermal condition corresponding to a thermal parameter exceeding a specified threshold, and a power condition corresponding to a specified power event.

Determining the OS-context configuration may include determining the OS-context configuration based on status information monitored during a specified interval of time preceding the anomaly alert. The anomalous condition may include a duration component, wherein determining the OS-context configuration comprises determining the OS-context configuration based on status information monitored during an interval corresponding to the duration component.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
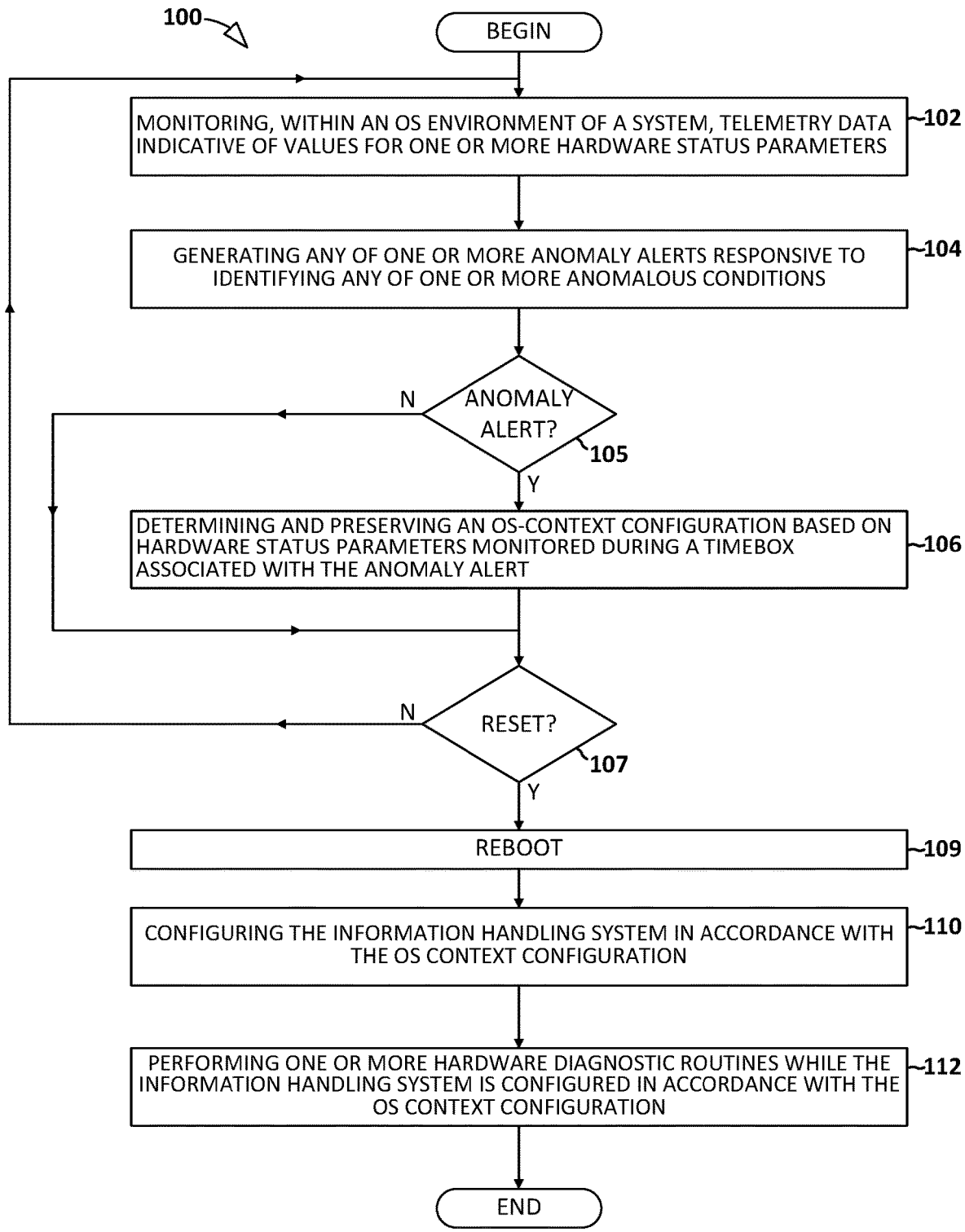
FIG. 1 illustrates a flow diagram of a method for performing OS-context, preboot diagnostics.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, the flow diagram of FIG. 1 illustrates a method 100 for preserving hardware state information, referred to herein as hardware status point information or, more simply, hardware status points observed, detected, or otherwise determined during or from within an OS-context and using the preserved status points during subsequently performed preboot diagnostics. The method 100 illustrated in FIG. 1, which may be performed by a suitable information handling systems provisioned with appropriate telemetry, begins with OS-context monitoring (operation 102) of telemetry data indicative of values for one or more hardware status parameters. The hardware status parameters may include parameters indicative of a usage, performance, or other characteristics of a hardware component. Illustrative examples of hardware status parameters that might be monitored during method 100 include CPU usage, CPU power consumption, memory usage, memory map information, graphics processing unit (GPU) load, I/O resource throughput, temperature information indicative of a skin temperature and/or an internal temperature, such as a junction temperature of a hardware component, information pertaining to systems fans, and dynamic tuning information.

The method 100 depicted in FIG. 1 further includes generating (operation 104) any one or more anomaly alerts selected from a group of anomaly alerts in response to identifying or otherwise detecting any one or more of a corresponding group of predetermined anomalous conditions. Illustrative examples of anomalous conditions include, a blue screen error condition, also referred to as a stop error condition, a fan speed condition corresponding to a fan speed exceeding a fan speed threshold for a specified duration, a battery charging rate condition indicating a battery discharge rate exceeding a battery discharge rate threshold, a battery charging rate falling below a charging rate threshold, a thermal condition corresponding to a thermal parameter exceeding a specified threshold, and a power condition corresponding to a specified power event.

In response to detecting (operation 105) one of the predetermined anomalous conditions, method 100 may determine (operation 106) and preserve a configuration status of the information handling system based on any one or more of the hardware status parameters monitored during an interval of time, referred to herein as a timebox, associated with the anomaly alert. Because the configuration status determined in operation 106 is based on OS-context status parameters, the configuration status is referred to herein as an OS-context configuration status. The OS-context configuration status may be preserved for retrieval during a subsequent boot sequence by storing the configuration status to a persistent storage resource that is accessible during the boot sequence. For embodiments that employ a Universal Extensible Firmware Interface (UEFI) boot sequence, the OS-context configuration status may be stored to the EFI System Partition (ESP), which may be located in a hard drive, solid stated drive (SSD), or another storage location. As depicted in FIG. 1, method 100 next determines (operation 107) whether a system reset has occurred. If no system reset has occurred, method 100 may loop back and repeat operations 102, 104, 105, and 106.

If a reset condition is detected (operation 107), method 100 may initiate (block 108) a customized boot sequence that includes configuring the information handling system in accordance with the OS-context configuration to restore the system to a state that is same or substantially similar to the OS-context configuration identified and preserved in operation 106. As an illustrative example, if the OS-context configuration state detected in operation 106 included a particular fan speed, a particular CPU loading, and a particular memory configuration, operation 110 would configure the system in a pre-OS state with the same or substantially similar fan speed, CPU loading, and memory configuration. With the system configured to replicate or approximate the OS-context configuration state, the method 100 depicted in FIG. 1 performs (operation 112) one or more hardware diagnostic routines. In this manner, pre-OS diagnostics routines are more likely to encounter anomalies, particularly state-dependent anomalies that occurred in the OS-context.

Figure 2:
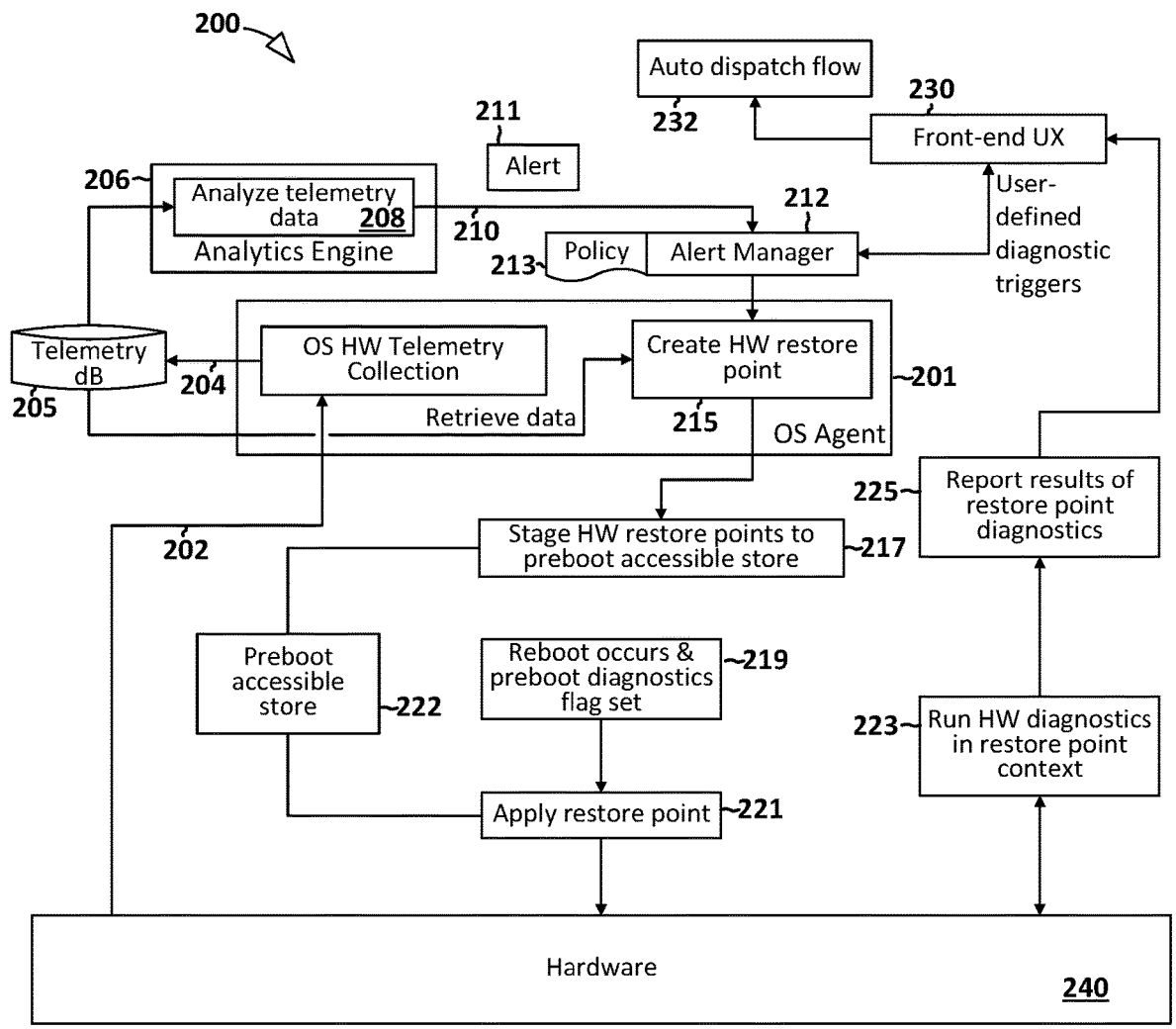
FIG. 2 illustrates a system and implementation for performing OS-context, preboot diagnostics.

FIG. 2 illustrates an exemplary implementation 200 of disclosed resources and operations for recording configuration information for a system running in an OS-context, i.e., while the applicable OS is active, in response to an alert signifying an anomalous condition or another suitable identifiable event and, during a subsequent boot sequence, restoring the system configuration to the recorded OS-context before performing pre-boot diagnostics. As depicted in FIG. 2, an OS diagnostics agent, referred to herein simply as OS agent 201, accesses, retrieves, or otherwise collects (operation 202) telemetry information from system hardware 240 and stores (operation 204) the collected telemetry information in a telemetry database 205. In some instances, collection operation 202 may occur in accordance with a pre-determined schedule, whether periodically or otherwise. In some cases, collection operation 202 may be initiated in accordance with an event or condition defined by an Information Technology (IT) decision maker (ITDM). In still other cases, a collection operation 202 may be initiated "manually," e.g., in response to input from an IT administrator.

As depicted in FIG. 2, hardware telemetry collected in operation 202 is stored (operation 204) in a telemetry database 205. A cloud-based or on-board OS analytics engine 206 may be configured to continuously monitor and analyze (operation 208) the telemetry data to generate (operation 210) alerts 211 for one or more defined anomalous conditions. Alerts 211 generated by analytics engine 206 are provided to an alert manager 212 provisioned with and/or coupled to an alert policy 213. Based on the alert 211 generated by analytics engine 206 and the alert policy 213, alert manager 212 may trigger OS agent 201 to create (operation 215) a hardware restore point, encapsulate the hardware restore point data with metadata and stage (operation 217) the hardware restore point for replay, at a later point in time, in a pre-boot context by storing the hardware restore point to a pre-boot accessible persistent storage medium 222. As depicted in FIG. 2, user-defined diagnostic triggers may be provided to alert manager 212 from a user interface identified in FIG. 2 as front end user experience (UX) 230.

In at least some embodiments, the determination of a hardware restore point may be timeboxed in accordance with the failure or other anomalous condition that resulted in the applicable alert 211. For purposes of this disclosure, timeboxing refers to the assigning of a specific time interval to each particular alert and the determination of the hardware restore points based on telemetry acquired during the specified time interval. As a qualitative, illustrative example, an anomalous condition corresponding to a fan speed exceeding a threshold fan speed for an interval of two hours may be assigned a two hour timebox for assessing the applicable hardware restore point while an anomalous condition corresponding to the appearance of the infamous blue screen of death (BSOD) might be assigned to a three minute timebox. Timeboxing is illustrated in FIG. 3 and disclosed in more detail in the accompanying description.

After a hardware restore point is staged in operation 217, disclosed pre-boot diagnostic features may, in at least some implementations, take no further action until the system is rebooted in response to a system reset. When a reboot occurs and a preboot diagnostics resource or service is indicated by a flag or other means (event 219), a restore point staged in the boot-accessible store is retrieved and the system configuration state defined by the restore point is applied (operation 221) to hardware components 240.

After the restore point has been applied to restore the system to the hardware configuration indicated in the restore point, the boot sequence may then run (operation 223) hardware diagnostics while the system remains in the restore point context. As depicted in FIG. 2, the results of the restore point diagnostics may be reported (operation 225) to a front-end user experience (UX) resource or service 230, e.g., a ProSupport Plus service from Dell Technologies. After completing the diagnostics, the result may be transferred to OS agent 201 via an existing interface. If a failure is detected, a visible message, QR code, or other communication may be delivered to the end-user. In at least some instances, based on the entitlement, an automatic hardware/software dispatch flow 232 may be invoked to fix the problem. For software, such a dispatch flow may include remediation via software and/or firmware update. For hardware, a dispatch flow may include delivery of a field replacement unit.

Figure 3:
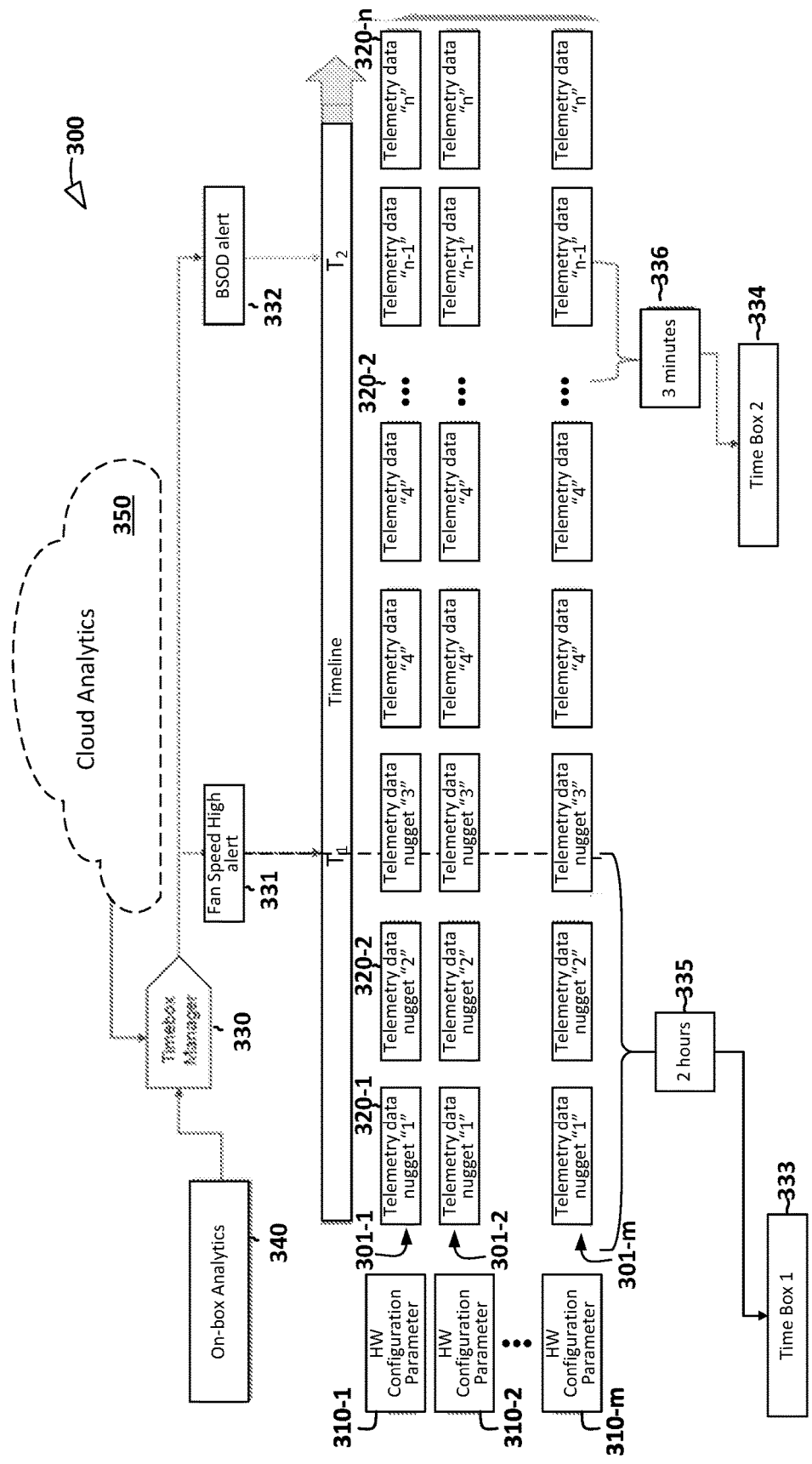
FIG. 3 illustrates timebox generation suitable for use the method of FIG. 1.

FIG. 3 illustrates a timeboxing element 300 employed, in conjunction with at least some embodiments of disclosed teachings, in the determination of hardware restore points. As discussed in preceding description of FIG. 1 and FIG. 2, a hardware restore point may be created in response to an alert corresponding to an anomalous condition and, preferably, the hardware restore point captures one or more characteristics of the system's configuration state that caused, contributed to, or otherwise influenced the occurrence of the anomalous condition. Recognizing that some anomalous conditions may occur immediately or very soon after a particular configuration state is reached while other anomalous conditions may not manifest themselves until a system has been in a particular configuration state for an extended duration, timeboxing improves the relevance of each hardware restore point by considering only the telemetry data from a window of time that is appropriate for the applicable anomalous condition.

FIG. 3 illustrates "m" telemetry data time series 301 (301-1, 301-2, . . . , 301-m) corresponding to "m" hardware configuration parameters 310 (310-1, 310-2, 310-m). Each of the time series 301 illustrated in FIG. 3 includes a chronological sequence of "n" telemetry data nuggets 320 (320-1, 320-2, . . . , 320-n), each of which includes telemetry data for the applicable hardware configuration parameter 310. For example, a first time series 301-1 includes "n" telemetry data nuggets (320-1 through 320-n) for a first hardware configuration parameter 310-1. Similarly, a second time series 301-2 includes "n" telemetry data nuggets for a second hardware configuration parameter 310-2, and so forth for each hardware configuration parameter.

As depicted in FIG. 3, a timebox manager 330 is communicatively coupled to an on-the-box analytics engine 340, a cloud-based analytics engine 350, or both. As suggested in the preceding description of FIG. 2, disclosed analytics engines may be configured to apply machine learning and/or one or more other forms of artificial intelligence to train and employ a predictive model for identifying anomalous configuration states. The on-box analytics engine 340 and cloud-based analytics engine 350 illustrated in FIG. 3 are both configured to message, signal, or otherwise inform timebox manager 330 when an anomalous condition is recognized or predicted.

In at least some embodiments, timebox manager 330 is configured to respond to an anomalous condition signal, received from either analytics engine (340, 350), by issuing an alert to trigger the creation of a timebox corresponding to the anomalous condition. In this context, a timebox refers to a collection of some or all telemetry data generated within a specified interval of time. The specified interval of time may be defined by a start time and a duration, e.g., a 20 minute time interval that starts at time T1 wherein the duration may be determined based on the anomalous condition.

As depicted in FIG. 3, timebox 330 generates a fan speed high (FSH) alert 331 at time T1 and a BSOD alert 332 at time T2. Each alert may be associated with a corresponding set of one or more conditions or criteria that, when satisfied, trigger the applicable alert.

The criteria associated with FSH alert 331 may, for example, include a threshold fan speed condition and a minimum duration condition and FSH alerts may be generated in response to fan speed telemetry data indicating a fan speed exceeding a predetermined threshold fan speed continuously for a 2-hour duration or, in another example, FSH alerts may be generated in response to the telemetry data indicating the fan speed exceeding the fan speed threshold for more than a threshold percentage of the 2 hour duration, where the threshold percentage would constitute an additional condition for triggering the alert. When the applicable conditions are met, timebox manager 330 may generate a timebox, identified in FIG. 3 as timebox 1 (333), that includes all telemetry data collected during the preceding 2-hour time interval 335.

The criteria associated with BSOD 332 may be simpler than the criteria for FSH alert 331 and may, in at least some embodiments, include as the sole criteria, a determination that the system is in a BSOD condition, which might include a determination that the system has "timed out" or otherwise failed to perform an anticipated action within a specified latency window. In this example, timebox manager 330 may generate a timebox, identified in FIG. 3 as timebox 2 (334), that includes telemetry data collected during the preceding 3-minute time interval 336. In this manner, the timebox generated for a particular anomalous condition may be customized or optimized for each anomalous condition. The 3-minute timebox used in the preceding description of BSOD alert 332 may, for example, reflect an assumption, determination, or prediction, that BSOD conditions occur abruptly and quickly following specific conditions while the 2-hour timebox used for FSH alert 331 may reflect an assumption, determination, or prediction that the existence of FSH conditions have little observable impact on system performance until the FSH conditions have persisted for 2-hours.

Figure 4:
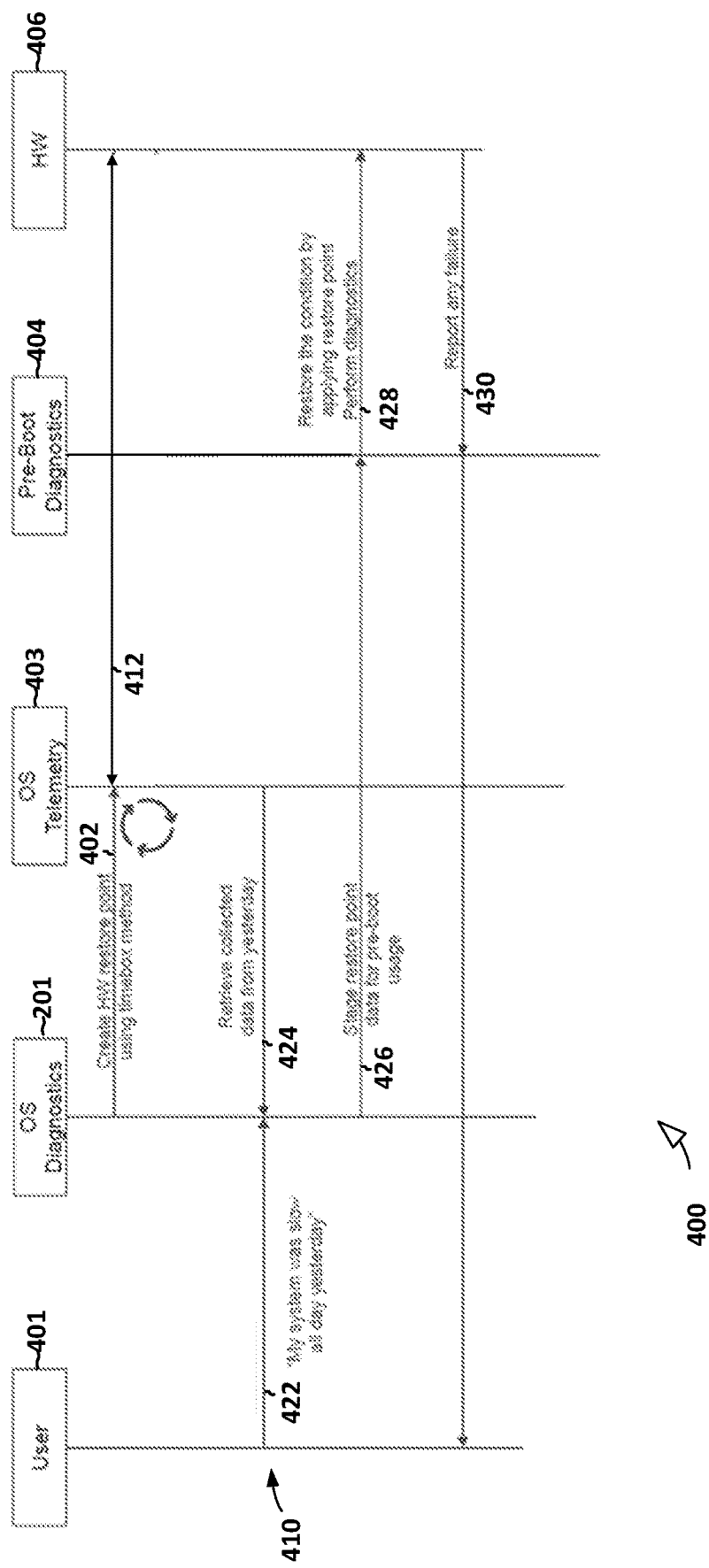
FIG. 4 illustrates a user-triggered implementation of disclosed teachings.
Figure 5:
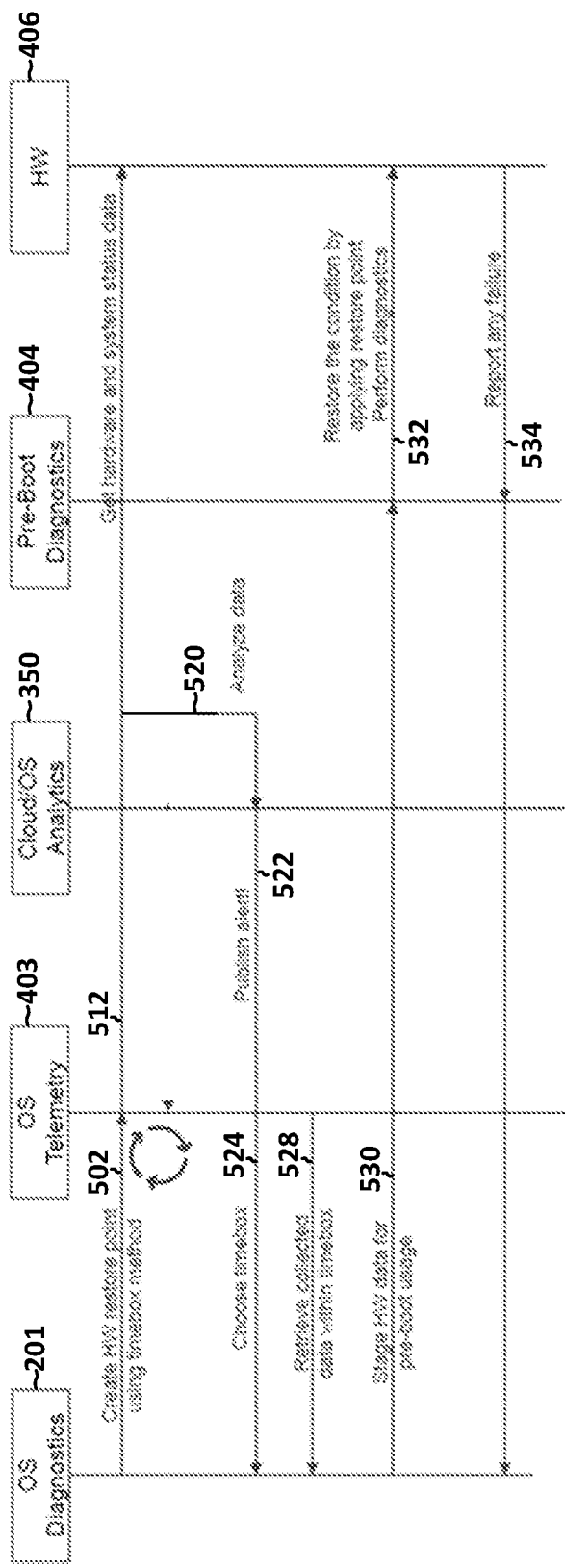
FIG. 5 illustrates alert triggered implementation of disclosed teachings.

Referring now to FIG. 4 and FIG. 5, FIG. 4 illustrates a user-triggered method 400 for performing OS-context, pre-boot diagnostics while FIG. 5 illustrates an alert triggered method 500 for performing OS-context preboot diagnostics. Referring first to the user-triggered method 400 depicted in FIG. 4, OS agent 201 communicates (402) with OS telemetry 403 to monitor OS telemetry data communicated (412) between OS telemetry 403 and hardware 406 and to generate, from time to time (e.g., when an anomalous condition is detected), hardware restore points based on telemetry data timeboxes as described above with respect to FIG. 3. The method 400 depicted in FIG. 4 further includes diagnostics operations 410 during which an IT administrator or other user 401 provides a triggering input 422 to initiate OS-context, preboot diagnostics. In at least some instances, user triggered operations 410 may apply a previously-generated hardware restore point when performing the pre-boot diagnostics. In other instances, the triggering input, in addition to triggering pre-boot diagnostics, also defines the hardware restore point to be applied during the preboot diagnostics. More specifically, triggering input 422 may indicate a window of time that can be used to define the hardware restore point, analogous to the timeboxes illustrated in FIG. 3. For example, the triggering input 422 illustrated in FIG. 4, "My system was slow all day yesterday," may be used to define a timebox encompassing telemetry recorded during the previous calendar day. In this example, the telemetry data from the previous calendar day may be retrieved (424) and staged (426) to a corresponding restore point for the pre-boot diagnostics 404. During the next boot sequence, pre-boot diagnostics 404 may restore (428) the system in accordance with the staged restore point information before executing preboot diagnostics and reporting (430) of any failures to OS agent 201.

Referring now to FIG. 5, the depicted alert-triggered method 500 for performing OS-context, preboot diagnostics begins, in a manner analogous to the beginning of method 400 (FIG. 4), with OS agent 201 communicating (502) with OS telemetry 403 to monitor OS telemetry data communicated (512) between OS telemetry 403 and hardware 406 and generating, from time to time (e.g., when an anomalous condition is detected), hardware restore points based on telemetry data timeboxes as described above with respect to FIG. 3. Departing from the user-triggered method 400, the method 500 illustrated in FIG. 5 includes cloud analytics 350 analyzing (520) telemetry data and publishing (522) an alert, e.g., in response to identifying an anomalous condition. OS agent 201, which has subscribed to at least some messages generated by cloud analytics 350, detects the alert and chooses (524) a timebox based on the published alert, as described in examples provided in FIG. 3 and the accompanying description. OS agent 201 may then retrieve (528) telemetry data associated with the chosen timebox and stage (530) restore point data corresponding to the retrieved telemetry data to pre-boot diagnostics 404. During the next boot sequence, preboot diagnostics 404 may restore (532) the system in accordance with the staged restore point information before executing preboot diagnostics and report (534) any failures that may be detected.

Figure 6:
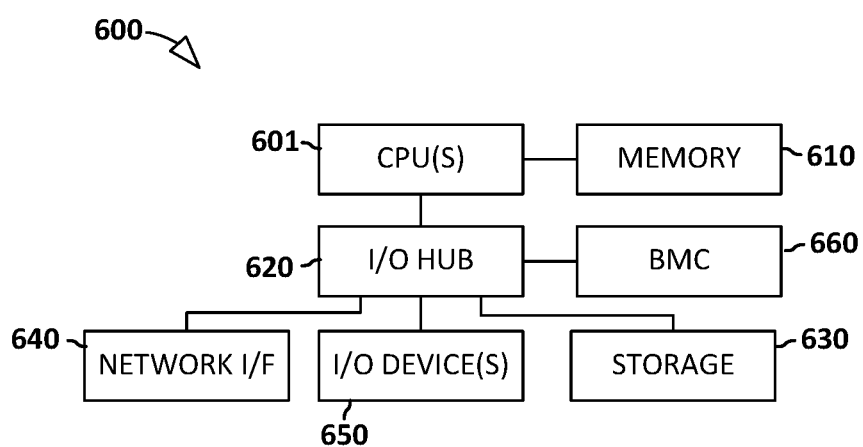
FIG. 6 illustrates an information handling system suitable for use in FIG. 1 through FIG. 5

Referring now to FIG. 6, any one or more of the elements illustrated in FIG. 1 through FIG. 2 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
monitoring, within an operating system (OS) environment of an information handling system, telemetry data indicative of values for one or more hardware status parameters;
generating any of one or more anomaly alerts responsive to identifying any of one or more anomalous conditions;
responsive to detecting an anomaly alert, determining an OS-context configuration based on the hardware status parameters monitored during a timebox associated with the anomaly alert; and
responsive to detecting a reset of the information handling system, performing preboot operations including:
configuring the information handling system in accordance with the OS-context configuration; and
performing one or more hardware diagnostic routines while the information handling system is configured in accordance with the OS-context configuration.

2. The method of claim 1, wherein the telemetry data is indicative of a usage, performance, or characteristic of a hardware component.

3. The method of claim 2, wherein the one or more hardware status parameters are selected from:
central processing unit (CPU) usage;
CPU power;
memory usage;
memory map information;
graphics processing unit (GPU) load;
input/output (I/O) resource throughput;
temperature information indicative of a skin or junction temperature of a hardware component;
fan information; and
dynamic tuning information.

4. The method of claim 1, wherein the one or more anomalous conditions include one or more anomalous conditions selected from:
a blue screen error condition;
a fan speed condition corresponding to a fan speed exceeding a fan speed threshold for a specified duration;
a battery discharge rate condition corresponding to a battery discharge rate exceeding a battery discharge rate threshold;
a thermal condition corresponding to a thermal parameter exceeding a specified threshold; and
a power condition corresponding to a specified power event.

5. The method of claim 1, wherein determining the OS-context configuration includes determining the OS-context configuration based on status information monitored during a specified interval of time preceding the anomaly alert.

6. The method of claim 5, wherein the anomalous condition includes a duration component and wherein determining the OS-context configuration comprises determining the OS-context configuration based on status information monitored during an interval corresponding to the duration component.

7. The method of claim 6, further comprising, subscribing to a subset of the one or more anomaly alerts, wherein said detecting an anomaly alert comprises detecting one of the subset of anomaly alerts.

8. The method of claim 1, wherein the anomaly alert comprises a user generated anomaly alert.

9. The method of claim 8, wherein the user generated anomaly alert includes a user specified time interval and wherein the OS-context configuration is determined based on the hardware status parameters monitored during the user specified time interval.

10. An information handling system, comprising:
monitoring, within an operating system (OS) environment of an information handling system, telemetry data indicative of values for one or more hardware status parameters;
generating any of one or more anomaly alerts responsive to identifying any of one or more anomalous conditions;
responsive to detecting an anomaly alert, determining an OS-context configuration based on the hardware status parameters monitored during a timebox associated with the anomaly alert; and
responsive to detecting a reset of the information handling system, performing preboot operations including:
configuring the information handling system in accordance with the OS-context configuration; and
performing one or more hardware diagnostic routines while the information handling system is configured in accordance with the OS-context configuration.

11. The information handling system of claim 10, wherein the telemetry data is indicative of a usage, performance, or characteristic of a hardware component.

12. The information handling system of claim 11, wherein the one or more hardware status parameters are selected from:
central processing unit (CPU) usage;
CPU power;
memory usage;
memory map information;
graphics processing unit (GPU) load;
input/output (I/O) resource throughput;
temperature information indicative of a skin or junction temperature of a hardware component;
fan information; and
dynamic tuning information.

13. The information handling system of claim 10, wherein the one or more anomalous conditions include one or more anomalous conditions selected from:
a blue screen error condition;
a fan speed condition corresponding to a fan speed exceeding a fan speed threshold for a specified duration;
a battery discharge rate condition corresponding to a battery discharge rate exceeding a battery discharge rate threshold;
a thermal condition corresponding to a thermal parameter exceeding a specified threshold; and
a power condition corresponding to a specified power event.

14. The information handling system of claim 10, wherein determining the OS-context configuration includes determining the OS-context configuration based on status information monitored during a specified interval of time preceding the anomaly alert.

15. The information handling system of claim 14, wherein the anomalous condition includes a duration component and wherein determining the OS-context configuration comprises determining the OS-context configuration based on status information monitored during an interval corresponding to the duration component.

16. The information handling system of claim 15, further comprising, subscribing to a subset of the one or more anomaly alerts, wherein said detecting an anomaly alert comprises detecting one of the subset of anomaly alerts.

17. The information handling system of claim 10, wherein the anomaly alert comprises a user generated anomaly alert.

18. The information handling system of claim 17, wherein the user generated anomaly alert includes a user specified time interval and wherein the OS-context configuration is determined based on the hardware status parameters monitored during the user specified time interval.

* * * * *